US006383575B1

(12) United States Patent
Badyal et al.

(10) Patent No.: US 6,383,575 B1
(45) Date of Patent: May 7, 2002

(54) METHOD FOR FORMING A METALLIC FILM USING NON-ISOTHERMAL PLASMA

(75) Inventors: Jas Pal Singh Badyal; Jonathan Mark Crowther, both of Durham; Allen Peter Gates, North Yorkshire, all of (GB)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/485,102

(22) PCT Filed: Aug. 18, 1998

(86) PCT No.: PCT/EP98/05289

§ 371 Date: Feb. 3, 2000

§ 102(e) Date: Feb. 3, 2000

(87) PCT Pub. No.: WO99/08803

PCT Pub. Date: Feb. 25, 1999

(30) Foreign Application Priority Data

Aug. 18, 1997 (GB) ............................................ 9717368

(51) Int. Cl.[7] ............................ C08F 2/52; H05H 1/24; H05H 1/48; B05D 3/06

(52) U.S. Cl. ....................... 427/535; 427/488; 427/539; 427/540

(58) Field of Search ................................ 427/488, 535, 427/537, 539, 540, 534

(56) References Cited

U.S. PATENT DOCUMENTS

| | | | | | |
|---|---|---|---|---|---|
| 3,686,018 | A | * | 8/1972 | Lindblom et al. | 427/537 |
| 4,109,052 | A | * | 8/1978 | Anderson | 427/124 |
| 4,165,394 | A | * | 8/1979 | Ehrbar et al. | 427/537 |
| 4,345,005 | A | * | 8/1982 | All et al. | 427/537 |
| 4,464,416 | A | * | 8/1984 | Liepins | 427/537 |
| 4,536,415 | A | * | 8/1985 | Martens et al. | 427/537 |
| 4,780,354 | A | * | 10/1988 | Nakayama et al. | 427/537 |
| 5,326,584 | A | * | 7/1994 | Kamel et al. | 427/491 |
| 5,576,071 | A | * | 11/1996 | Sandhu | 427/534 |
| 5,612,097 | A | * | 3/1997 | Foerch et al. | 427/491 |
| 5,643,639 | A | * | 7/1997 | Rudder et al. | 427/534 |
| 5,705,225 | A | * | 1/1998 | Dornfest | 427/535 |
| 6,027,851 | A | * | 2/2000 | Coppens et al. | 427/534 |

OTHER PUBLICATIONS

Patent Abstracts of Japan, Pub# 03199380, Aramaki Narimitsu for Toshiba Corp., "Method for forming organometallic compound into metallic film", Aug. 30, 1991.*

* cited by examiner

*Primary Examiner*—Marianne Padgett
(74) *Attorney, Agent, or Firm*—Breiner & Breiner, L.L.C.

(57) ABSTRACT

A method for metallising solid substrates involves the use of non-equilibrium plasma treatment of a supported metal precursor layer. This technique can be used to make pure metal or alloy coatings. An oxidising plasma pre-treatment step of the supported metal precursor layer, or the incorporation of a plasma polymer coupling layer prior to metallisation, can result in improved adhesion. The method can be applied to the preparation of lithographic printing plate precursors.

8 Claims, No Drawings

METHOD FOR FORMING A METALLIC FILM USING NON-ISOTHERMAL PLASMA

This invention relates to the formation of metal layers on substrates by non-isothermal, or non-equilibrium, plasma treatment.

The deposition of metal coatings onto solid substrates forms the basis of many everyday applications; these include: decorative finishings, electronic circuit components, gas barrier layers, gas sensors, and gas separation membranes. Methods currently employed for their fabrication include: chemical vapour deposition (CVD), electroplating, reduction of supported salts by laser, electron or ion beams, sputter deposition, electroless plating, physical vapour deposition, retroplating, thermal treatment of polymer supported metal salts, and metal hydride reduction. All of these methods suffer from at least one of the following drawbacks: copious solvent use, high temperatures, expensive vacuum apparatus, or exotic metal precursors.

An alternative approach is provided by the present invention, which is based on the non-equilibrium plasma treatment of supported metal precursors. The invention provides a method for the production of a metal film on a solid substrate which involves coating a substrate surface with a metal precursor and reducing said metal precursor by means of non-equilibrium plasma treatment. The metal precursor is coated from a solution via spin coating or dipping or solvent casting or spraying onto a substrate (or pre-treated substrate) and then treated with a non-isothermal (non-equilibrium) plasma to form a metal film, said treatment effectively reducing the metal precursor to the corresponding metal.

Metal precursors which are suitable for use in accordance with the method of the present invention include organometallic compounds, metallorganic compounds and salts of suitable metals. A wide range of metals may be applied to substrate surfaces using the method of the present invention, and particularly favourable results have been achieved using precursors including, for example, the acetates, nitrates and chlorides of palladium, platinum, gold and silver.

Various plasmas are available for use in the method of the invention, and these include non-equilibrium plasmas such as those generated by radio-frequencies (RF), microwaves or direct current (DC). They may operate from above atmospheric to sub-atmospheric pressures according to the known state of the art. Typical plasmas include low pressure RF plasmas, low pressure microwave plasmas, atmospheric microwave plasmas, atmospheric silent discharge plasmas and atmospheric glow discharge plasmas.

The plasma treatment is advantageously carried out in the presence of a feed gas to provide improved flow. Examples of suitable feed gases are hydrogen and the noble gases—helium, neon, argon, krypton and xenon.

Any suitable substrate may be used when performing the invention, among the most useful being metals such as aluminium, polymers including nylon 66 and polytetrafluoroethylene (PTFE), and glass. Furthermore, the shape and form of the substrate is not limited so that, for example, containers of various styles and dimensions may be treated by the method of the invention, in addition to planar substrates.

If the substrate which is employed is non-wettable towards the metal precursor solution (e.g. a PTFE substrate) then a plasma polymer coupling layer (e.g. maleic anhydride, allylamine, acrylic acid, etc.) can first be deposited to improve the adhesion of the metal precursor to the substrate. The metal precursor can then be deposited onto this plasma polymer layer and subsequently reduced. Optionally, the metal precursor may be dissolved in solution with a suitable polymer and coated on the substrate together with the said polymer.

Improved adhesion may also be achieved by subjecting the supported metal precursor to an oxidising plasma pre-treatment step prior to the non-equilibrium plasma treatment. The oxidising plasma pre-treatment is carried out in the presence of oxygen as the feed gas.

Various coating solvents are useful for coating the metal precursor, as would be apparent to those skilled in the art, the principal criterion in selection being the solubility of the precursor in the solvent. Thus, many common organic solvents, in addition to aqueous media, provide suitable coating solvents. However, particularly favourable results have been achieved when using chloroform or, most preferably, acetonitrile as the coating solvent. Coating efficiency may be enhanced by the incorporation of a surfactant in the coating solution, preferably a non-ionic surfactant, most preferably a non-ionic alkyl phenol ethoxylate such as Triton® X-100. In this way, the adsorption of the metal precursor on to the substrate can be increased, leading to increased adhesion of the plasma-reduced metal.

Of particular interest is the use of a metal, preferably aluminium, as the substrate. Most advantageously, a substrate comprising aluminium which has been grained and anodised on at least one surface may be used to facilitate the production of a lithographic printing plate precursor. Preferably, in this case, the deposited metal is silver, which may be conveniently deposited from a solution of a silver salt such as, for example, silver nitrate. The improved adhesion associated with the use of a surfactant in the coating solution is especially beneficial in such cases, providing enhanced print endurance during printing operations on a printing press. Lithographic printing plate precursors provided according to the method of the present invention may be directly imaged by means of ablative techniques, for example imagewise thermal exposures, prior to mounting on a printing press. The advantages in terms of time and expense of such techniques, which avoid the necessity for the use of costly intermediate film and processing chemicals, are well known to those skilled in the art.

It is known that an ablative printing plate may be produced by forming silver on to a grained and anodised aluminium substrate and imagewise exposing such a precursor to a high powered laser, preferably one outputting at infra-red wavelengths. Such precursors can be manufactured by the electroless deposition of a silver salt, or through the photographic diffusion transfer process, as described, for example, in PCT patent applications nos. EP 98/03474, EP 98/03475, EP 98/03476, EP 98/03480, EP 98/03481, EP 98/03482, EP 98/03483 and EP 98/03484. However, the manufacture of such precursors is both complex and expensive. The method of the present invention, on the other hand, provides a cost effective route to the manufacture of such a precursor. Also, unlike other methods of metal deposition used to make ablative printing plates, such as sputtering or vacuum deposition as described in Japanese patent application no. 37104/1977, the method of the present invention is capable of producing silver in a more finely divided colloidal form which absorbs infra-red radiation more efficiently and thus gives rise to increased sensitivity.

Some specific examples of the methodology are now described in order to illustrate the invention, though without limitation of the scope thereof:

EXAMPLE 1

Palladium(II) acetate was dissolved in chloroform and spin coated onto a glass substrate, then exposed to a 13.56

MHz hydrogen plasma at 10 W power and 0.15 mbar pressure for 30 minutes. This resulted in the formation of a metallic palladium layer.

EXAMPLE 2

Silver(I) nitrate was dissolved in acetonitrile and spin coated onto a glass substrate, then exposed to a 13.56 MHz hydrogen plasma at 10 W power and 0.15 mbar pressure for 30 minutes. This resulted in the formation of a metallic silver layer.

EXAMPLE 3

Platinum(IV) chloride was dissolved in acetonitrile and spin coated onto a glass substrate, then exposed to a 13.56 MHz hydrogen plasma at 10 W power and 0.15 mbar pressure for 30 minutes. This resulted in the formation of a metallic platinum layer.

EXAMPLE 4

Gold(III) chloride was dissolved in acetonitrile and spin coated Onto a Nylon 66 substrate, then exposed to a 13.56 MHz hydrogen plasma at 30 W power and 0.15 mbar pressure for 30 minutes. This resulted in the formation of a metallic gold layer.

EXAMPLE 5

Palladium(II) acetate and silver(I) nitrate were dissolved together in acetonitrile and spin coated onto a glass substrate, then exposed to a 13.56 MHz hydrogen plasma at 30 W power and 0.15 mbar pressure for 30 minutes. This resulted in the formation of a palladium/silver alloy layer.

EXAMPLE 6

A layer of maleic anhydride was plasma deposited on a PTFE substrate. A solution of platinum(II) chloride in acetonitrile was then spin coated over the maleic anhydride layer; the metal precursor layer showed good adhesion to the substrate due to the presence of the intervening maleic anhydride layer. The assembly was then exposed to a 13.56 MHz hydrogen plasma at 10 W power and 0.15 mbar pressure for 30 minutes. This resulted in the formation of a metallic platinum layer.

EXAMPLE 7

Silver nitrate (10 g) was dissolved in acetonitrile (100 g) and spin coated on to a grained and anodised aluminium substrate of the type used in the manufacture of lithographic printing plates to give a silver-equivalent coating weight of 0.5 $g/m^2$. The coated substrate was then exposed to a 13.56 MHz hydrogen plasma at 10 W power and 0.15 mbar pressure for 30 minutes. The resulting assembly, comprising silver adhered to the tough surface of the grained and anodised aluminium substrate, was loaded on to a Gerber Crescent 42T Laser platesetter and imagewise exposed to a 10 W YAG laser outputting at a wavelength of 1064 nm and delivering 8 $MW/cm^2$ power density to create an image by removal of the silver. After exposure, the plate was treated with a commercially available finishing solution (Silverlith® SDB finisher from Agfa-Gevaert Ltd.), comprising a silver oleophilising agent and a desensitising gum, prior to going to press in order to ensure good press start-up. The plate was loaded on to a Drent Web Offset press and several thousand good impressions were obtained.

EXAMPLE 8

Silver nitrate (10 g) was dissolved in acetonitrile (100 g). To this mixture was added Triton® X-100 (a commercial, non-ionic surfactant) (1 g). The solution was spin coated onto a grained and anodised aluminium substrate, and a printing plate was produced according to the method described in Example 7. On printing, approximately 50% more good impressions were obtained in comparison with Example 7.

EXAMPLE 9

Gold(III) chloride was dissolved in acetonitrile and spin coated onto a Nylon 66 substrate, then exposed to a 13.56 MHz noble gas plasma (e.g. argon or helium) at 30 W power and 0.15 mbar pressure for 30 minutes. This resulted in the formation of a metallic gold layer.

EXAMPLE 10

Gold(III) chloride was dissolved in acetonitrile and spin coated onto a Nylon 66 substrate, then exposed to a silent discharge (dielectric barrier discharge) in air for 10 minutes at atmospheric pressure operating at 3 kHz, 11kV, with an electrode gap of 3.00±0.05 mm. This resulted in the formation of a metallic gold layer.

EXAMPLE 11

Silver(I) nitrate was dissolved in acetonitrile with Triton® X-100 as surfactant and spin coated onto an aluminium substrate, then exposed to a 13.56 MHz hydrogen gas plasma at 10 W power and 0.15 mbar pressure for 10 minutes. This resulted in the formation of a metallic silver layer.

EXAMPLE 12

Copper(II) nitrate was dissolved in acetonitrile with Triton® X-100 as surfactant and spin coated onto an aluminium substrate, then exposed to a 13.56 MHz hydrogen gas plasma at 10 W power and 0.15 mbar pressure for 10 minutes. This resulted in the formation of a metallic copper layer.

EXAMPLE 13

A glass substrate was exposed to a 13.56 MHz oxygen plasma at 10 W power and 0.15 mbar pressure for 30 minutes. Palladium(II) acetate was dissolved in acetonitrile and spin coated onto the treated substrate which was then exposed to a 13.56 MHz hydrogen plasma at 10 W power and 0.15 mbar pressure for 30 minutes. This resulted in the formation of a metallic palladium layer.

EXAMPLE 14

A glass substrate was exposed to a 13.56 MHz oxygen plasma at 10 W power and 0.15 mbar pressure for 30 minutes. Silver(I) nitrate was dissolved in acetonitrile and spin coated onto the treated substrate which was then exposed to a 13.56 MHz hydrogen plasma at 10 W power and 0.15 mbar pressure for 30 minutes. This resulted in the formation of a metallic silver layer.

What is claimed is:

1. A method for producing a metal film on an aluminum substrate comprising the steps of coating a surface of a grained and anodized aluminum substrate with a metal precursor and thereafter reducing said metal precursor by means of non-equilibrium plasma treatment, wherein said metal precursor is a silver salt.

2. A method as defined in claim 1 wherein said plasma treatment is carried out using hydrogen as a feed gas.

3. A method as defined in claim 1 wherein said plasma treatment is carried out using a noble gas, comprising at least one of helium, neon, argon, krypton or xenon, as the feed gas.

4. A method as defined in claim 1 wherein the metal precursor is dissvolved in solution with a polymer prior to coating the substrate.

5. A method as defined in claim 1 wherein a plasma polymer coupling layer comprising maleic anhydride, allylamine or acrylic acid is deposited on the substrate prior to coating with the metal precursor.

6. A method as defined in claim 1 wherein the substrate is treated with an oxidising plasma prior to coating with said metal precursor.

7. A method as defined in claim 1 wherein said metal precursor comprises a mixture of metal precursors.

8. A method as defined in claim 1 wherein said metal precursor comprises an organometallic compound.

* * * * *